US012361872B2

(12) United States Patent
Zeng

(10) Patent No.: US 12,361,872 B2
(45) Date of Patent: Jul. 15, 2025

(54) BRIGHTNESS COMPENSATION METHODS AND BRIGHTNESS COMPENSATION DEVICES

(71) Applicant: Shenzhen China Star Optoelectronics Semiconductor Display Technology Co., Ltd., Guangdong (CN)

(72) Inventor: Yuchao Zeng, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/525,956

(22) Filed: Dec. 1, 2023

(65) Prior Publication Data

US 2024/0386843 A1 Nov. 21, 2024

(30) Foreign Application Priority Data

May 15, 2023 (CN) ......................... 202310543988.5

(51) Int. Cl.
*G09G 3/3208* (2016.01)

(52) U.S. Cl.
CPC ... *G09G 3/3208* (2013.01); *G09G 2320/0233* (2013.01); *G09G 2320/0276* (2013.01)

(58) Field of Classification Search
CPC ......... G09G 3/3208; G09G 2320/0233; G09G 2320/0276; G09G 3/2074; G09G 3/32
See application file for complete search history.

(56) References Cited

U.S. PATENT DOCUMENTS

| | | | | |
|---|---|---|---|---|
| 6,791,566 B1 * | 9/2004 | Kuratomi | H04N 5/57 | 345/589 |
| 2006/0284805 A1 * | 12/2006 | Baek | G09G 3/3607 | 345/88 |
| 2014/0104259 A1 * | 4/2014 | Oh | G09G 3/3266 | 345/212 |
| 2016/0379555 A1 * | 12/2016 | Kim | G09G 3/3291 | 345/691 |

* cited by examiner

*Primary Examiner* — Stephen G Sherman

(74) *Attorney, Agent, or Firm* — PV IP PC; Wei Te Chung

(57) ABSTRACT

Brightness compensation method and brightness compensation devices are provided. The brightness compensation method includes: obtaining brightness values of subpixels in a frame of display image; determining a first compensation gain according to the brightness values of the subpixels; obtaining position coordinates corresponding to the subpixels according to positions of the subpixels in a coordinate system; obtaining second compensation gains corresponding to the subpixels according to the position coordinates corresponding to the subpixels; and performing a brightness compensation on the frame of display image according to the second compensation gains corresponding to the subpixels and the first compensation gain.

20 Claims, 9 Drawing Sheets

BRIGHTNESS COMPENSATION METHODS AND BRIGHTNESS COMPENSATION DEVICES

CROSS-REFERENCE TO RELATED APPLICATION

This application claims priority to Chinese Patent Application No. 202310543988.5, filed on May 15, 2023, the disclosure of which is incorporated herein by reference in its entirety.

TECHNICAL FIELD

The present disclosure relates to the field of display technologies, and in particular, to brightness compensation methods and brightness compensation devices.

BACKGROUND

Because of the impedance of power supply traces, for display panels configured to emit light with a power supply voltage, there is a problem of uneven in-plane display (Mura) due to voltage drop when the power supply voltage is transmitted to a power supply line. The display panels experiencing the voltage drop may include organic light-emitting diode display panels and micro-light emitting diode display panels.

Therefore, for display panels that emit light with the power supply voltage, such as organic light-emitting diode display panels and micro-light-emitting diode display panels, the display brightness may be affected due to the problem of voltage drop. Specifically, the voltage drop may vary depending on a value of a driving current and positions of subpixels on the display panel. In related art, the Demura compensation algorithm is introduced to improve the brightness differences in different areas of the display panel. However, differences between brightness information of frames of display images of the display panel may also lead to different degrees of voltage drop, and further lead to a deviation of a gamma curve, so the problem of uneven display may still exist.

SUMMARY

In view of above, brightness compensation methods are provided according to embodiments of the present disclosure. The brightness compensation method includes: obtaining brightness values of subpixels in a frame of display image; determining a first compensation gain according to the brightness values of the subpixels; obtaining position coordinates corresponding to the subpixels according to positions of the subpixels in a coordinate system; obtaining second compensation gains corresponding to the subpixels according to the position coordinates corresponding to the subpixels; and performing a brightness compensation on the frame of display image according to the second compensation gains corresponding to the subpixels and the first compensation gain.

Brightness compensation devices are also provided according to embodiments of the present disclosure. The brightness compensation device includes: a frame of display image brightness acquisition module, configured to obtain brightness values of subpixels in a frame of display image; a position coordinate acquisition module, configured to obtain position coordinates corresponding to the subpixels according to positions of the subpixels in a coordinate system; a compensation gain acquisition module, configured to acquire a first compensation gain based on the brightness values of the subpixels, and acquire second compensation gains according to the position coordinates of the subpixels respectively; and a brightness compensation module, configured to compensate the frame of display image according to the first compensation gain and the second compensation gains.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments in the present disclosure, all other embodiments obtained by those skilled in the art without making creative efforts fall within the protection scope of the present disclosure.

In addition, the terms “first”, “second”, etc. in the description and claims of the present disclosure are used to distinguish different objects, rather than describing a specific sequence. The terms “include” and “comprise” and any variations thereof are intended to cover non-exclusive inclusion.

Features of the various exemplary embodiments of the present disclosure may be partially or fully coupled or combined with each other and may technically interact or work together in various ways. Exemplary embodiments may be performed independently or in association with each other.

Hereinafter, various exemplary embodiments of the present disclosure will be described in detail with reference to the accompanying drawings. In the following exemplary embodiments, a display device will be described with reference to an organic light-emitting display device, but is not limited thereto.

Figure 1:
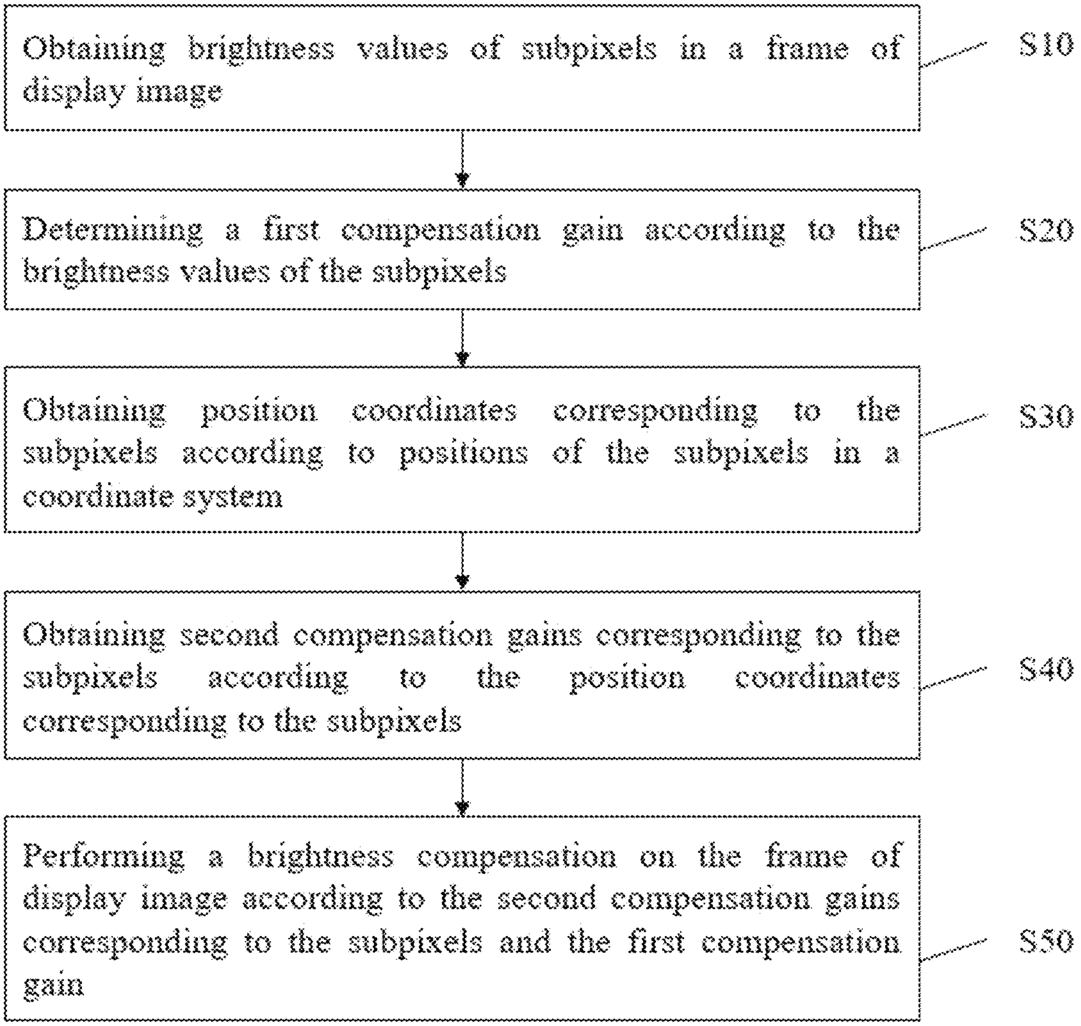
FIG. 1 is a schematic flow chart of a brightness compensation method according to embodiments of the present disclosure.

Referring to FIG. 1, which illustrates a flow chart of a brightness compensation method according to embodiments of the present disclosure, the brightness compensation method provided by the embodiments includes following steps of S10, S20, S30, S40, and S50.

The step S10 includes: obtaining brightness values of subpixels in a frame of display image.

The frame of display image refers to a display image presented by writing one frame of pixel data to all subpixels of a display panel in one vertical period.

Specifically, the pixel data of an input image is displayed by a pixel array, thus the display panel displays the image. The pixel array includes a plurality of data lines, a plurality of scanning lines, and a plurality of pixels. The pixels may be arranged in a display area of the display panel in a matrix defined by the data lines and the scanning lines. The pixels may also be arranged in the display area in shapes of strips or diamond shapes each emitting light of the same color. If a resolution of the pixel array is m*n, that is, the pixel array includes m pixel columns and n pixel rows each intersecting the pixel columns.

Specifically, each pixel may be divided into a red subpixel, a green subpixel, and a blue subpixel. Each subpixel includes the same pixel circuit.

Specifically, in the step S10, input data of each subpixel may be extracted, and then the input data of each subpixel may be subjected to brightness normalization conversion to obtain the brightness value of each subpixel.

A calculation formula of the brightness value of the subpixel is: $LUM\_pixel=(D\_pixel/Lmax)^{gma}$, where D_pixel refers to the input data of the subpixel, Lmax refers to a maximum grayscale value of the display panel, LUM_pixel refers to the brightness value of the subpixel, and gma refers to a gamma value of the display panel. The maximum grayscale value of the display panel is related to a number of bits of the input data of the subpixel. When the number of the bits of the input data of the subpixel is 8 bits, the maximum grayscale value of the display panel is 255 grayscales; and when the number of the bits of the input data of the subpixel is 10 bits, the maximum grayscale value of the display panel is 1023 grayscales.

From the above, the brightness values of all subpixels in a frame of display image may be obtained.

The step S20 includes: determining a first compensation gain according to the brightness values of the subpixels.

Figure 2:
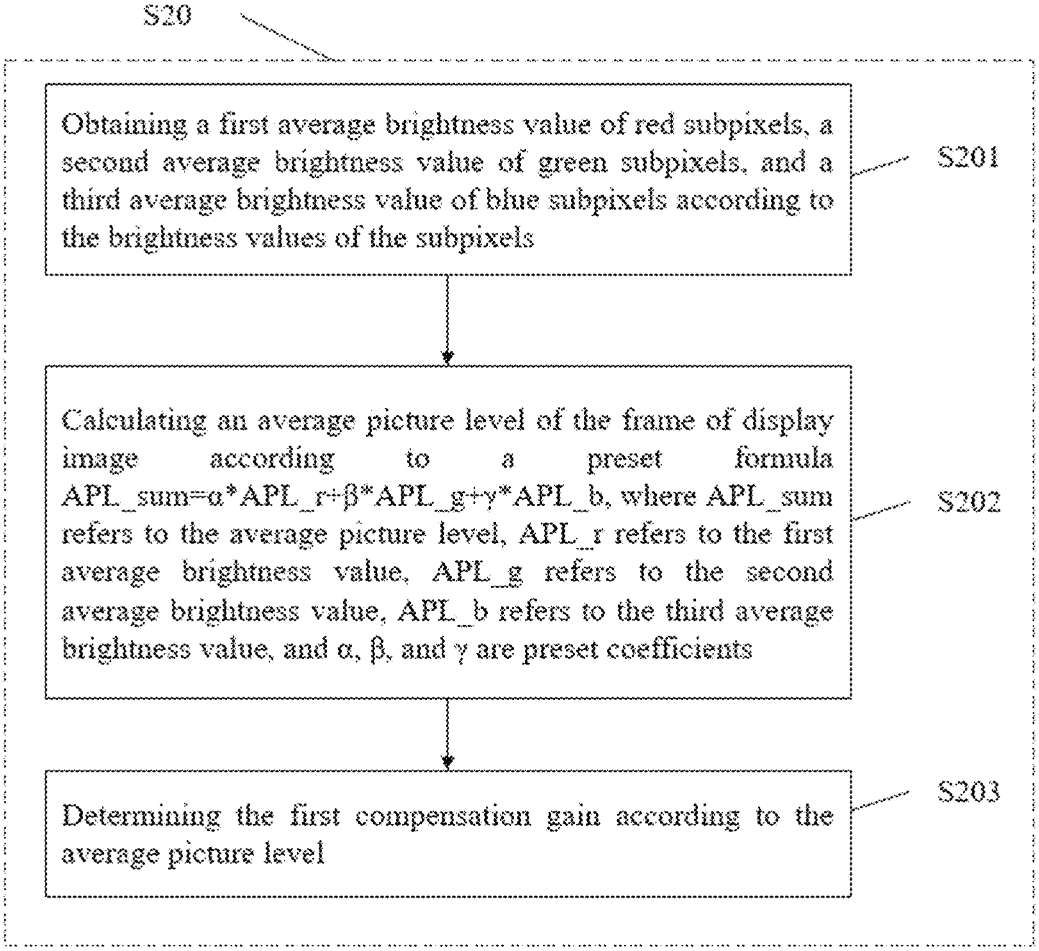
FIG. 2 is a specific flow chart of a step S20 in FIG. 1.

In some embodiments, referring to FIG. 2, which is a specific flow chart of the step S20 in FIG. 1, a specific method for implementing the step S20 includes following steps of S201, S202, and S203.

The step S201 includes: obtaining a first average brightness value of red subpixels, a second average brightness value of green subpixels, and a third average brightness value of blue subpixels according to the brightness values of the subpixels.

The first average brightness value refers to an average value calculated based on a sum of the brightness values of all red subpixels in the frame of display image and a number of all red subpixels. The second average brightness value refers to an average value calculated based on a sum of the brightness values of all green subpixels in the frame of display image and a number of all green subpixels. The third average brightness value refers to refers to an average value calculated based on a sum of the brightness values of all blue subpixels in the frame of display image and a number of all blue subpixels.

Taking the pixel array as an example including m pixel columns and n pixel rows, and each pixel includes a red subpixel, a green subpixel, and a blue subpixel, then the number of all red subpixels, the number of all green subpixels, and the number of all blue subpixels are all m*n. The first average brightness value is equal to LUM_rsum/(m*n), the second average brightness value is equal to LUM_gsum/(m*n), and the third average brightness value is equal to LUM_bsum/(m*n), where LUM_rsum refers to the sum of the brightness values of all red subpixels in the frame of display image, LUM_gsum refers to the sum of the brightness values of all green subpixels in the frame of display image, and LUM_bsum refers to the sum of the brightness values of all blue subpixels in the frame of display image.

The step S202 includes: calculating an average picture level of the frame of display image according to a preset formula $APL\_sum=\alpha*APL\_r+\beta*APL\_g+\gamma*APL\_b$, where APL_sum refers to the average picture level, APL_r refers to the first average brightness value, APL_g refers to the second average brightness value, APL_b refers to the third average brightness value, and α, β, and γ are preset coefficients.

The average picture level (APL) refers to refers to an average vale of average components of picture-signal amplitudes in the line validity periods over the entire frame period excluding the line and field blanking periods.

Values of the preset coefficients α, β, and γ are determined by the characteristics of the display panel, and they must satisfy: $\alpha+\beta+\gamma=1$.

When the pixel also includes a white subpixel that emit white light, the preset formula should satisfy: $APL\_sum=\alpha*APL\_r+\beta*APL\_g+\gamma*APL\_b+\delta*APL\_w$, where APL_w refers to a fourth average brightness value of the white subpixels, and δ refers to a preset coefficient corresponding to the fourth average brightness value, and that $\alpha+\beta+\gamma+\delta=1$ needs to be satisfied.

The step S203 includes: determining the first compensation gain according to the average picture level.

It is necessary to find a compensation gain (that is, the first compensation gain) corresponding to the average picture level of the current frame of display image on a preset curve. It should be understood that the average picture levels of different frames of display images may be different, and the first compensation gains corresponding to the average picture levels may correspondingly be different.

Figure 3:
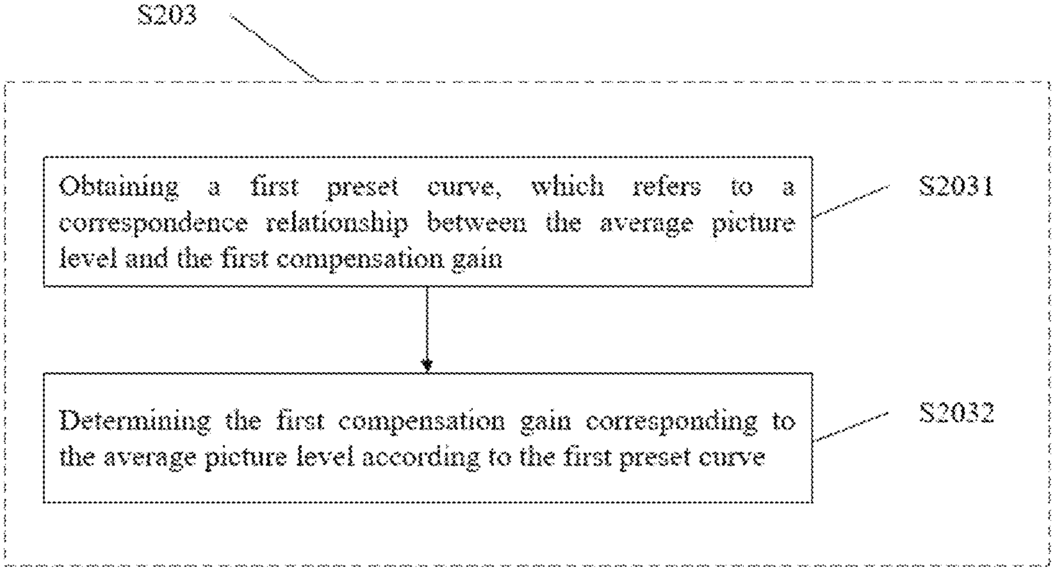
FIG. 3 is a specific flow chart of a step S203 in FIG. 2.

In some embodiments, referring to FIG. 3, which is a specific flow chart of the step S203 in FIG. 2, a specific method for implementing the step S203 includes following steps of S2031 and S2032.

The step S2031 includes: obtaining a first preset curve, which refers to a correspondence relationship between the average picture level and the first compensation gain.

The first preset curve is established in advance and refers to a curve illustrating the correspondence relationship between the average picture level and the first compensation gain. The first compensation gain is equivalent to a weighting coefficient provided for each subpixel to compensate for a brightness difference of the display image, so as to avoid the deviation of a gamma curve caused by the brightness difference between a plurality of frames of display images.

The step S2032 includes: determining the first compensation gain corresponding to the average picture level according to the first preset curve.

Figure 4:
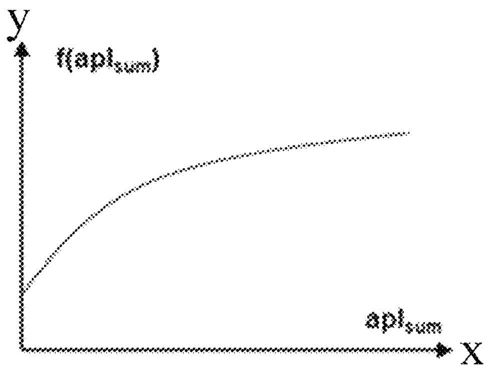
FIG. 4 illustrates a first preset curve according to embodiments of the present disclosure.

As shown in FIG. 4, which illustrates a first preset curve, in which an axis coordinate value $apl_{sum}$ along the x direction represents a value of the average picture level, and an axis coordinate value $f(apl_{sum})$ along the y direction represents a value of the first compensation gain. The first compensation gain may be obtained according to the average picture level of the corresponding frame of display image.

It should be understood that, assuming that the same frame of display image is displayed, the value of the first compensation gain corresponding to each subpixel in the display panel is the same.

Figure 5:
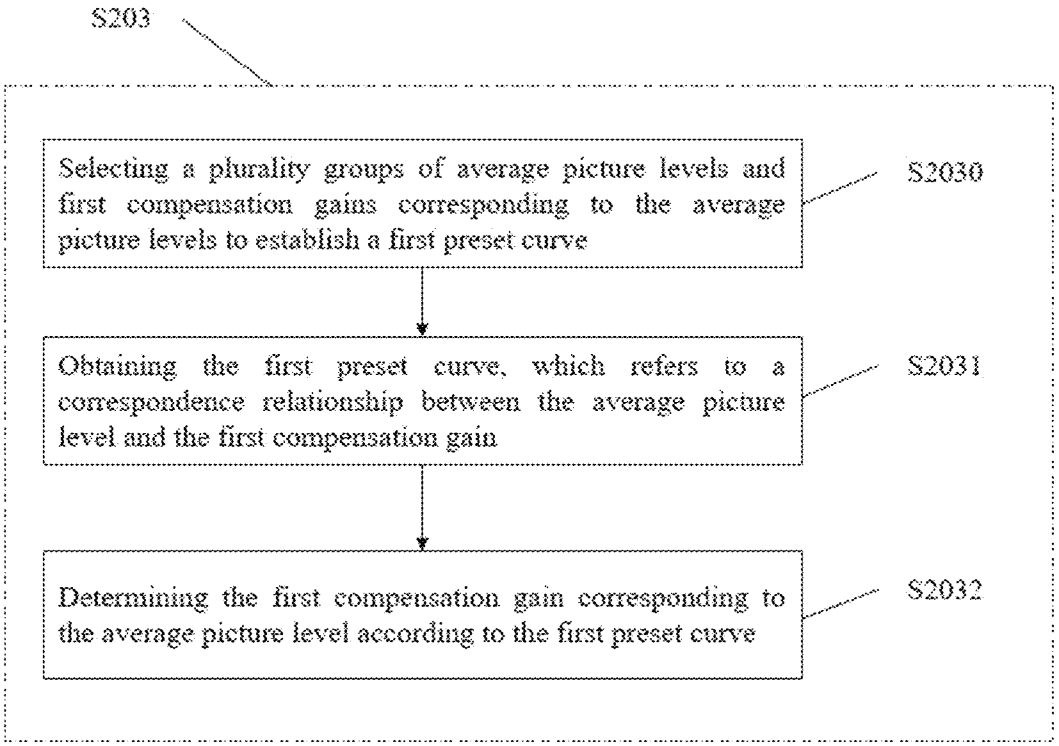
FIG. 5 is another specific flow chart of a step S203 in FIG. 2.

In some embodiments, referring to FIG. 5, which is another specific flow chart of the step S203 in FIG. 2, the step S203 also includes a step S2030 before the step S2031 of obtaining the first preset curve.

The step S2030 includes: selecting a plurality groups of average picture levels and first compensation gains corresponding to the average picture levels to establish the first preset curve.

In each group, the first compensation gain corresponding to the average picture level is measured and calculated through several experiments.

Specifically, the value of the average picture level may be used as an axis coordinate of a first axis, the value of the first compensation gain may be used as an axis coordinate of a second axis, each group of the average picture levels and the first compensation gains may be converted into one coordinate point, and a smooth transition curve obtained by drawing the coordinate points is used as the first preset curve. The first axis and the second axis are in a perpendicular relationship, and the term "perpendicular" refers to a state where an angle formed by the first axis and the second axis is more than 80° and less than 100°, and specifically more than 85° and less than 95°.

In some embodiments, the average picture levels in the plurality of groups are in an arithmetic sequence relationship, and the first compensation gains corresponding to the average picture levels are obtained through a plurality of experimental measurements and calculations. Each group of the average picture levels and the first compensation gains are converted into one coordinate point, and the smooth transition curve is obtained by determining intermediate values between adjacent coordinate points, and then the smooth transition curve is used as the first preset curve.

It should be understood that the step S2030 only needs to be before the step S2031, and the step S2030 may also be before the step S10, or the step S201, or the step S202.

The step S30 includes: obtaining position coordinates corresponding to the subpixels according to positions of the subpixels in a coordinate system.

Figure 6:
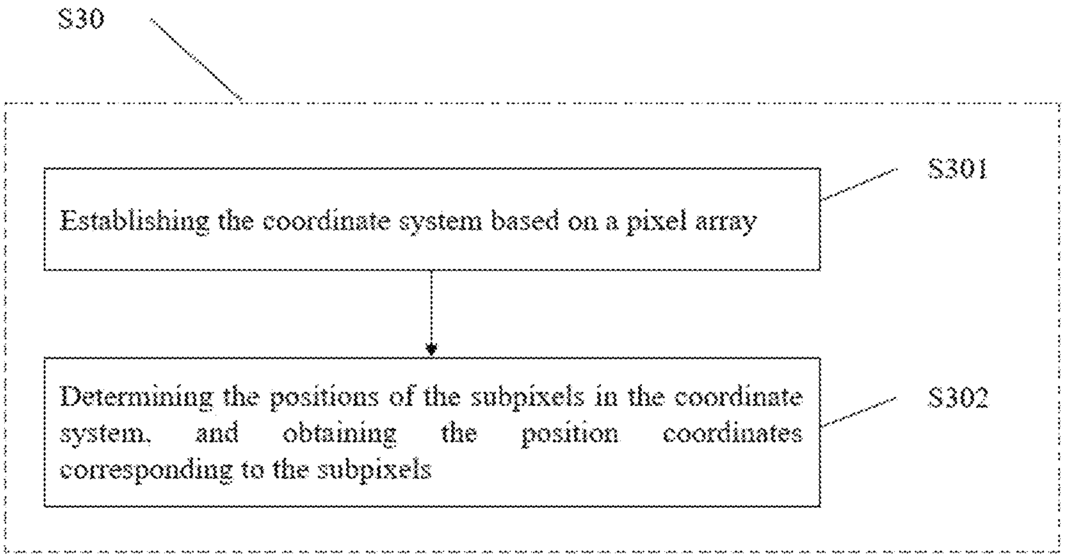
FIG. 6 is a specific flow chart of step a S30 in FIG. 1.

In some embodiments, referring to FIG. 6, which is a specific flow chart of the step S30 in FIG. 1, a method for implementing the step S30 may specifically include steps of S301 and S302.

The step S301 includes: establishing a coordinate system based on the pixel array.

The coordinate system may be designed according to a resolution of the display panel. For example, the resolution of the display panel is m*n, which means that the pixel array of the display panel includes m pixel columns and n pixel rows. In other words, the coordinate system in this step is established according to a number of the pixel columns and a number of the pixel rows of the pixel array. There are m subpixels in each row along a row direction, and there are n subpixels in each column along a column direction, thus, the coordinates of the subpixels are all between coordinates (0, 0) and coordinates (m−1, n−1).

The step S302 includes: determining the positions of the subpixels in the coordinate system, and obtaining the position coordinates corresponding to the subpixels.

Specifically, a coordinate value of one subpixel P in the column direction is defined as a first coordinate value Xp of the subpixel P, and a coordinate value of the same subpixel P in the row direction is defined as a second coordinate value Yp of the subpixel, then it can be determined that the position coordinate corresponding to the subpixel P is (Xp, Yp).

In the same way, the position coordinates corresponding to the subpixels on the display panel can be obtained, so that corresponding position compensation gains may be determined according to differences between the positions of the subpixels in subsequent steps.

The step S40 includes: obtaining second compensation gains corresponding to the subpixels according to the position coordinates corresponding to the subpixels.

Figure 7:
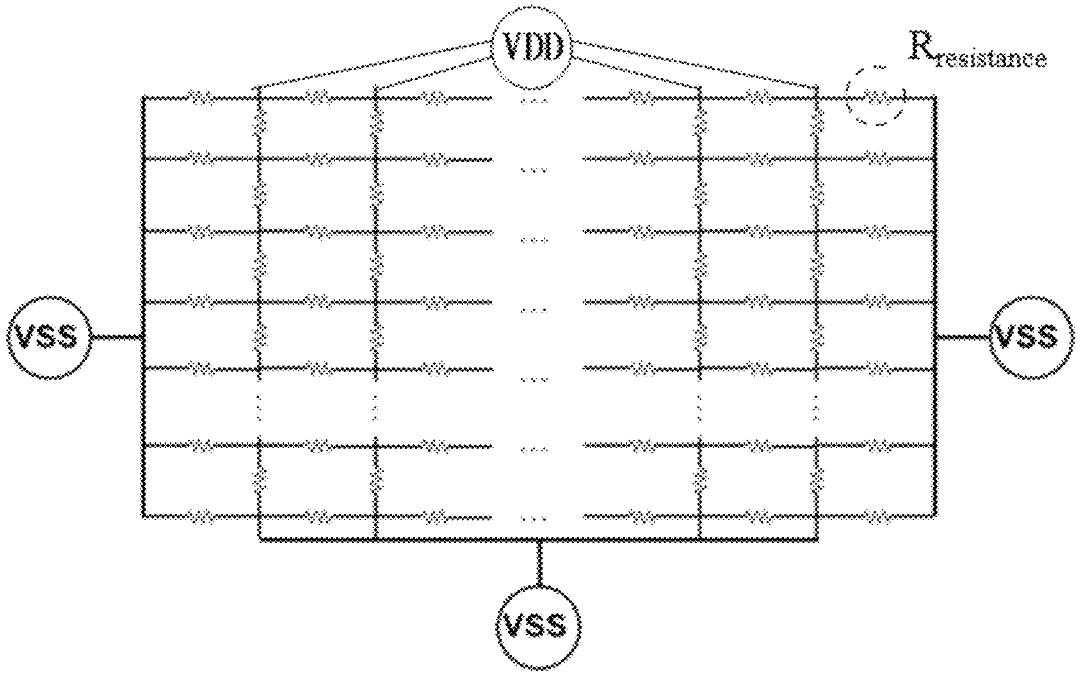
FIG. 7 is a schematic diagram of an impedance distribution of power supply traces of a display panel according to embodiments of the present disclosure.

In the display panel, the brightness of each subpixel depends on a driving current flowing through the subpixel. That is, the brightness of each subpixel is positively correlated with the driving current. Referring to FIG. 7, which is a schematic diagram of an impedance distribution of power supply traces of the display panel according to embodiments of the present disclosure, since each power supply trace providing the driving voltage to each subpixel has its own resistance $R_{resistance}$, there may be a voltage drop when each subpixel emitting light and displaying, and based on different positions of the subpixels in the pixel array, different distances between each subpixel and a VDD power terminal are different, so the voltage drops of the power supply traces may cause differences in the driving currents of the subpixels, and thus resulting in differences in the brightness of the subpixels.

Therefore, by determining the second compensation gains of the subpixels, the step S40 solves the problem of differences in brightness caused by different positions of the subpixels. That is, the second compensation gain is a weighting coefficient provided for each subpixel to compensate for the position difference of the subpixels, so as to compensate for the brightness difference caused by the voltage drops.

Figure 8:
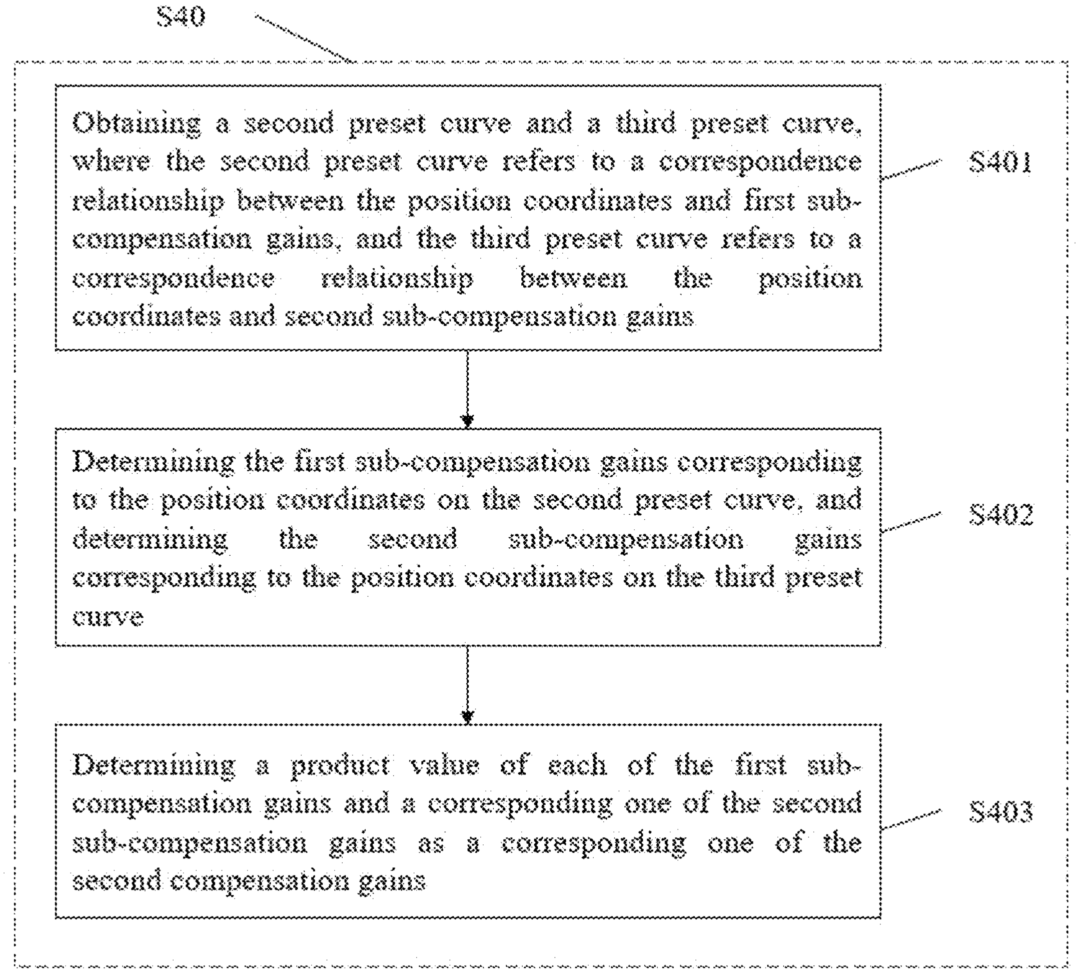
FIG. 8 is a specific flow chart of a step S40 in FIG. 1.

Specifically, referring to FIG. 8, which is a specific flow chart of the step S40 in FIG. 1, a method for implementing the step S40 in the embodiments specifically includes steps of S401, S402, and S403.

The step S401 includes: obtaining a second preset curve and a third preset curve, where the second preset curve refers to a correspondence relationship between the position coordinates and first sub-compensation gains, and the third preset curve refers to a correspondence relationship between the position coordinates and second sub-compensation gains.

The second preset curve is established in advance and may refer to a curve illustrating a correspondence relationship between the first sub-compensation gain and one of the coordinate values in the row direction and the column direction. The third preset curve is established in advance and may refer to a curve of a correspondence relationship between the second sub-compensation gain and the other one of the coordinate values of in the row direction and the column direction.

The step S402 includes: determining the first sub-compensation gains corresponding to the position coordinates on the second preset curve, and determining the second sub-compensation gains corresponding to the position coordinates on the third preset curve.

Figure 9:
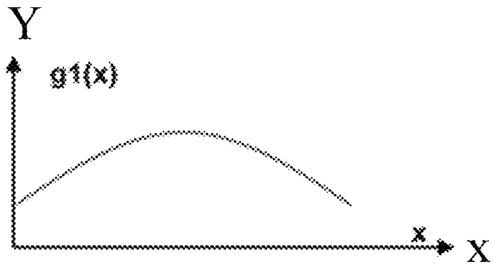
FIG. 9 illustrates a second preset curve according to embodiments of the present disclosure.

Referring to FIG. 9, which illustrates a second preset curve, in which the axis coordinate value x along the X direction represents the coordinate value of the subpixel in the row direction, and the axis coordinate value g1(x) along the Y direction represents a value of the first sub-compensation gain. The first sub-compensation gain is obtained according to the position coordinate of the corresponding subpixel in the coordinate system.

Figure 10:
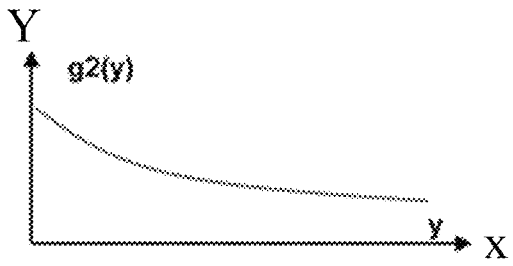
FIG. 10 illustrates a third preset curve according to embodiments of the present disclosure.

Referring to FIG. 10, which illustrates a third preset curve, in which the axis coordinate value y along the X direction represents the coordinate value of the subpixel in the column direction, and the axis coordinate value g2(y) along the Y direction represents a value of the second sub-compensation gain. The second sub-compensation gain is obtained according to the position coordinate of the corresponding subpixel in the coordinate system.

It should be understood that even assuming that the same frame of display image is displayed, the values of the first sub-compensation gains corresponding to the subpixel in the display panel are different, and the values of the second sub-compensation gains corresponding to the subpixels in the display panel are different.

The step S403 includes: determining a product of the first sub-compensation gain and the second sub-compensation gain as the second compensation gain.

That is, the second compensation gain g(x,y)=g1(x)*g2(y). The second compensation gain of the corresponding subpixel is jointly determined by the first sub-compensation gain and the second sub-compensation gain.

Figure 11:
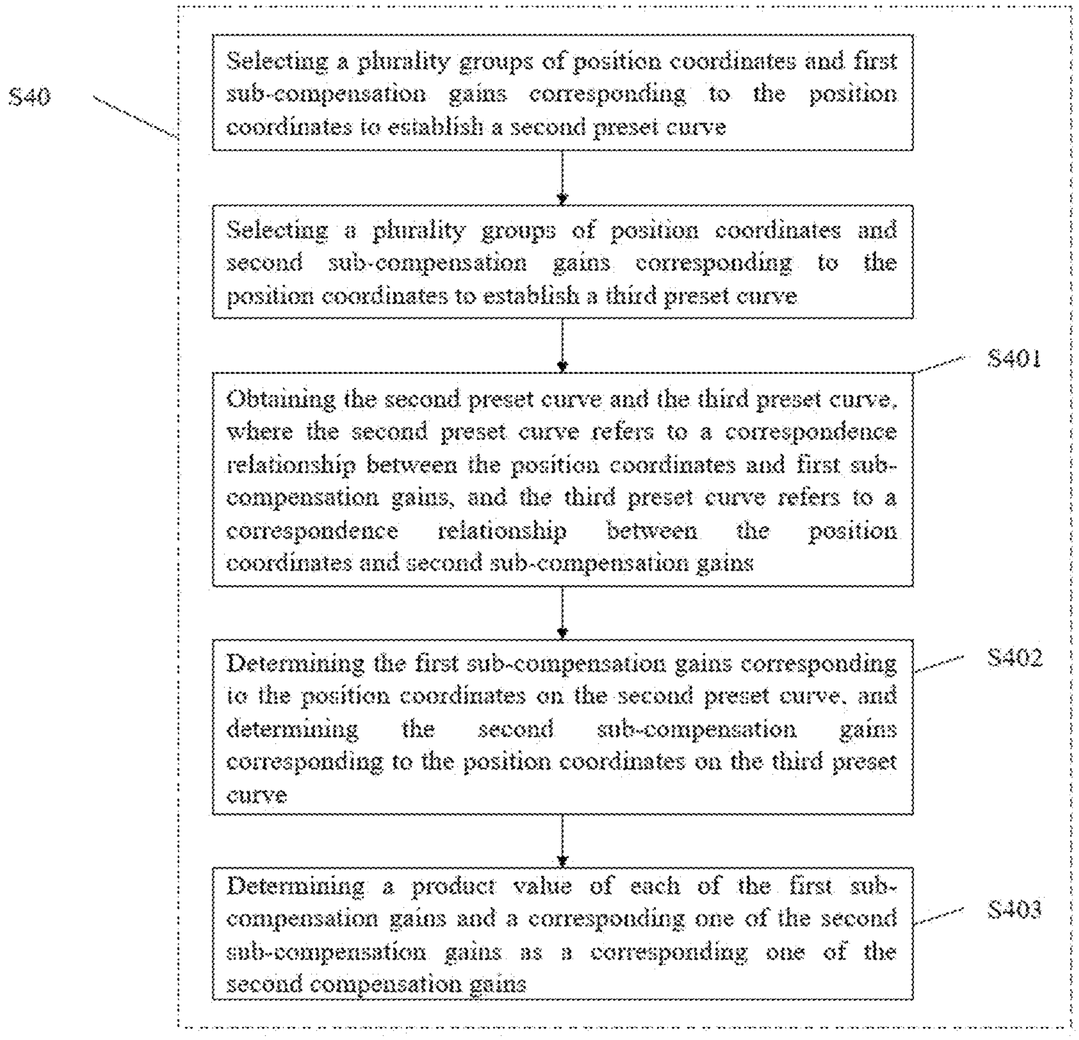
FIG. 11 is another specific flow chart of a step S40 in FIG. 1.

In some embodiments, referring to FIG. 11, which is another specific flow chart of the step S40 in FIG. 1, the step S40 also includes steps of S4001 and S4002 before the step of obtaining the second preset curve and the third preset curve.

The step S4001 includes: selecting a plurality groups of position coordinates and first sub-compensation gains corresponding to the position coordinates to establish the second preset curve.

In each group, the first sub-compensation gain corresponding to the position coordinate is measured and calculated through several experiments.

Specifically, the coordinate in the row direction may be defined as an axis coordinate of a first axis, the value of the first sub-compensation gain may be defined as an axis coordinate of a second axis, each group of the position coordinate and the first sub-compensation gain may be converted into one coordinate point, and a smooth transition curve obtained by drawing points is used as the second preset curve. The first axis and the second axis are in a perpendicular relationship, and the term "perpendicular" refers to a state where an angle formed by the first axis and the second axis is more than 80° and less than 100°, and specifically more than 85° and less than 95°.

The step S4002 includes: selecting a plurality groups of position coordinates and second sub-compensation gains corresponding to the position coordinates to establish the third preset curve.

In each group, the second sub-compensation gain corresponding to the position coordinate is measured and calculated through several experiments.

Specifically, the coordinate in the column direction may be defined as an axis coordinate of a first axis, the value of the second sub-compensation gain may be defined as an axis coordinate of a second axis, each group of the position coordinate and the second sub-compensation gain may be converted into one coordinate point, and a smooth transition curve obtained by drawing points is used as the third preset curve. The first axis and the second axis are in a perpendicular relationship, and the term "perpendicular" refers to a state where an angle formed by the first axis and the second axis is more than 80° and less than 100°, and specifically more than 85° and less than 95°.

It should be understood that there is no order requirement between the step S4001 and the step S4002, as long as they are implemented before the step S401, the step S4001, and the step S4002, and they may can also be before the step S10, or the step S20, or the step S30.

The step S50 includes: performing a brightness compensation on the frame of display image according to the second compensation gains corresponding to the subpixels and the first compensation gain.

Figure 12:
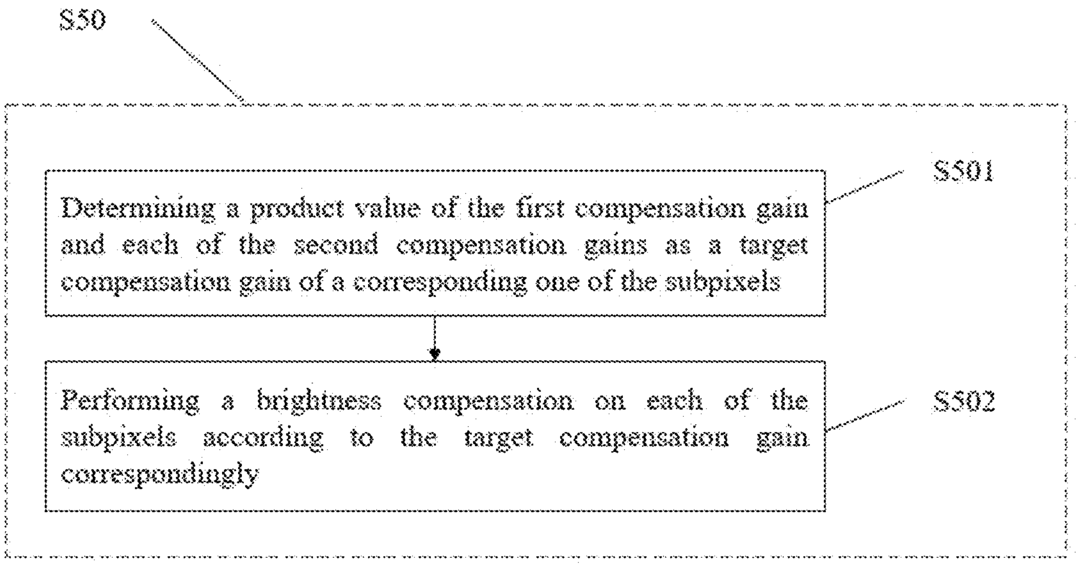
FIG. 12 is a specific flow chart of a step S50 in FIG. 1.

In some embodiments, referring to FIG. 12, which is a specific flow chart of the step S50 in FIG. 1, the step S50 may specifically include steps of S501 and S502.

The step S501 includes: determining a product of the first compensation gain and the second compensation gain as a target compensation gain of a corresponding one of the subpixels.

That is, the target compensation gain=f($apl_{sum}$)*g(x,y), and the target compensation gain of one subpixel is jointly determined by the first compensation gain and the second compensation gain corresponding to the subpixel.

The step S502 includes: performing a brightness compensation on each of the subpixels according to the target compensation gain correspondingly.

Figure 13:
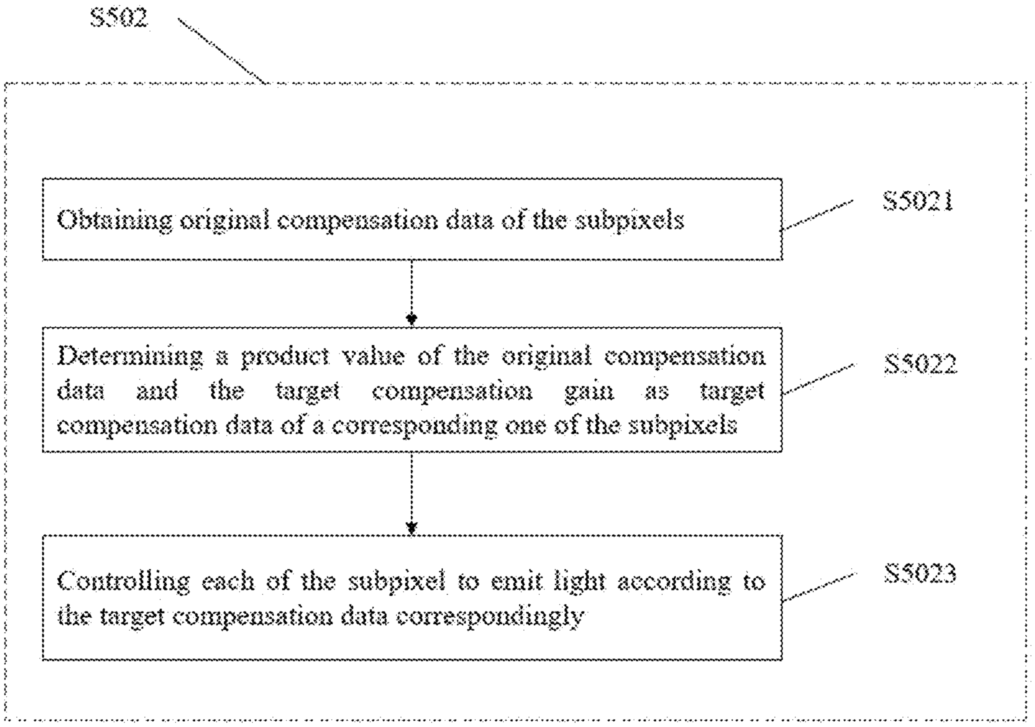
FIG. 13 is a specific flow chart of a step S502 in FIG. 12.
Figure 14:
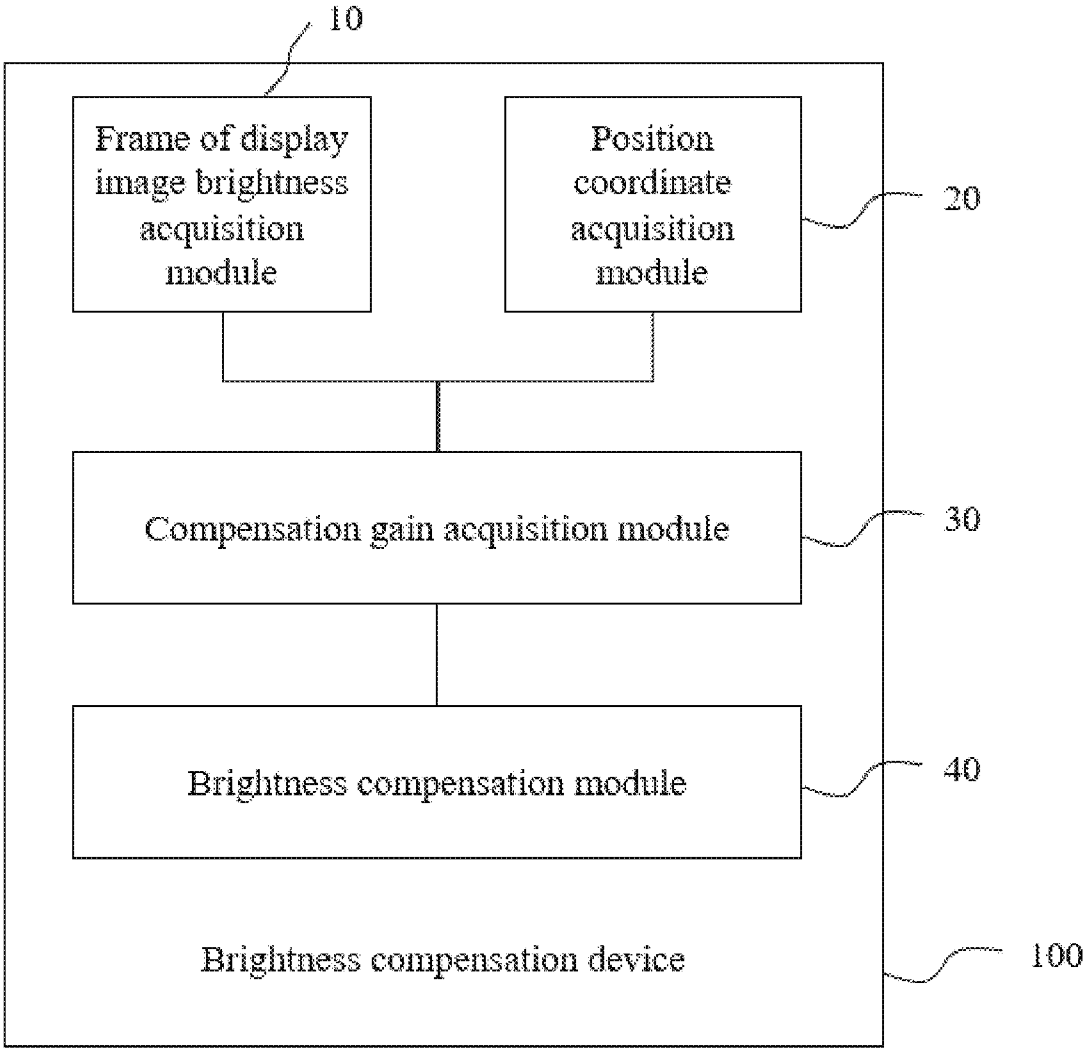
FIG. 14 is a block diagram showing modules of a brightness compensation device according to embodiments of the present disclosure.

Specifically, in some embodiments, referring to FIG. 13, which is a specific flow chart of the step S502 in FIG. 12, the step S502 may specifically include steps of S5021, S5022, and S5023.

The step S5021 includes: obtaining original compensation data of the subpixels.

The original compensation data of the subpixels refers to a compensation data obtained according to the Demura algorithm or other compensation methods in the related art to make the subpixels of the frame of display image have uniform light.

The step S5022 includes: determining a product of the original compensation data and the target compensation gain as target compensation data of a corresponding one of the subpixels.

That may be expressed as: output_data-input_data*f($apl_{sum}$)*g(x,y), where input_data refers to the original compensation data of the subpixel, and output_data refers to the target compensation data of the subpixel.

The step S5023 includes: controlling each of the subpixel to emit light according to the target compensation data correspondingly.

Specifically, the target compensation data of each subpixel is input to a data driving circuit, so that the display panel displays the image and implements brightness compensation on the frame of display image. It should be understood that in the step S503, all subpixels may be controlled to emit light according to the target compensation data, or subpixels in a specific area of the display panel may be controlled to emit light according to the target compensation data.

In the brightness compensation methods provided in the present disclosure, the compensation gains of the subpixels are correspondingly determined according to the average brightness of the frame of display image and the coordinates of the subpixels, so that the deviation of the gamma curve caused by the brightness difference of the frame of display image and the brightness difference caused by the difference in positions of the subpixels may be simultaneously compensated, which improves the display uniformity of the display image.

The present disclosure also provides brightness compensation devices 100. The brightness compensation device 100 includes a frame of display image brightness acquisition module 10, a position coordinate acquisition module 20, a compensation gain acquisition module 30, and a brightness compensation module 40.

The frame of display image brightness acquisition module is configured to obtain the brightness values of the subpixels in the frame of display image.

The position coordinate acquisition module is configured to obtain the position coordinates corresponding to the subpixels according to the positions of the subpixels in the coordinate system.

The compensation gain acquisition module is configured to acquire the first compensation gain based on the brightness values of the subpixels, and acquire the second compensation gains according to the position coordinates of the subpixels respectively.

The brightness compensation module is configured to compensate the frame of display image according to the first compensation gain and the second compensation gains.

Each module in the brightness compensation device provided in the embodiments may be implemented as a hardware component, the processing performed by each module may be implemented by individual modules or units, for example, a field programmable gate array (FPGA) or an application specific integrated circuit (ASIC).

The brightness compensation devices provided by the present disclosure determine the corresponding compensation gain of each subpixel by determining the average brightness of the frame of display image and the position coordinate of each subpixel in the frame of display image, so that so that the deviation of the gamma curve caused by the brightness difference of the frame of display image and the brightness difference caused by the difference in positions of the subpixels may be simultaneously compensated, which improves the display uniformity of the display image.

The above are only examples of the present disclosure, and do not limit the scope of the present disclosure. Any equivalent structure or equivalent process transformation made using the contents of the description and drawings of the present disclosure, or directly or indirectly applied in other related technical fields are similarly included in the protection scope of the present disclosure.

What is claimed is:

1. A brightness compensation method, comprising:

obtaining brightness values of subpixels in a frame of display image;

determining a first compensation gain according to the brightness values of the subpixels;

obtaining position coordinates corresponding to the subpixels according to positions of the subpixels in a coordinate system;

obtaining second compensation gains corresponding to the subpixels according to the position coordinates corresponding to the subpixels; and performing a brightness compensation on the frame of display image according to the second compensation gains corresponding to the subpixels and the first compensation gain, wherein a calculation formula of the brightness values of the sabpixels is: $LUM\_pixel=(D\_pixel/Lmax)^{gma}$, where D_pixel refers to an input data of each of the subpixels, Lmax refers to a maximum grayscale value of a display panel comprising the subpixels, LUM_pixel refers to each of the brightness values of the subpixels, and gma refers to a gamma value of the display panel.

2. The brightness compensation method according to claim 1, wherein the step of determining the first compensation gain according to the brightness values of the subpixels comprises:

obtaining a first average brightness value of red subpixels, a second average brightness value of green subpixels, and a third average brightness value of blue subpixels according to the brightness values of the subpixels;

calculating an average picture level of the frame of display image according to a preset formula $APL\_sum=\alpha*APL\_r+\beta*APL\_g+\gamma*APL\_b$, where APL_sum refers to the average picture level, APL_r refers to the first average brightness value, APL_g refers to the second average brightness value, APL_b refers to the third average brightness value, and α, β, and γ are preset coefficients; and determining the first compensation gain according to the average picture level.

3. The brightness compensation method according to claim 2, wherein each of the first average brightness value, the second average brightness value, and the average brightness value is calculated based on a sum of the brightness values of corresponding ones of the subpixels in the frame of display image and a number of the corresponding ones of the subpixels.

4. The brightness compensation method according to claim 2, wherein $\alpha+\beta+\gamma=1$.

5. The brightness compensation method according to claim 2, wherein the step of determining the first compensation gain according to the average picture level comprises:

obtaining a first preset curve, which refers to a correspondence relationship between the average picture level and the first compensation gain; and determining the first compensation gain corresponding to the average picture level according to the first preset curve.

6. The brightness compensation method according to claim 5, further comprising:

selecting a plurality groups of average picture levels and first compensation gains corresponding to the average picture levels to establish the first preset curve.

7. The brightness compensation method according to claim 6, wherein a first coordinate system has a first axis and a second axis in a perpendicular relationship, values of the average picture levels are used as axis coordinates of the first axis, values of the first compensation gains are used as axis coordinates of the second axis, values of each group of average picture levels and the first compensation gains are converted into one coordinate point, and a smooth transition curve obtained by drawing coordinate points is defined as the first preset curve.

8. The brightness compensation method according to claim 7, wherein the average picture levels in the plurality of groups are in an arithmetic sequence relationship, and the first compensation gains corresponding to the average picture levels are obtained through a plurality of experimental measurements and calculations, and the smooth transition curve is obtained by determining an intermediate value between every two adjacent ones of the coordinate points.

9. The brightness compensation method according to claim 1, wherein the step of obtaining the position coordinates corresponding to the subpixels according to the positions of the subpixels in the coordinate system comprises;

establishing the coordinate system based on a pixel array; and determining the positions of the subpixels in the coordinate system, and obtaining the position coordinates corresponding to the subpixels.

10. The brightness compensation method according to claim 1, wherein the step of obtaining the second compensation gains corresponding to the subpixels according to the position coordinates corresponding to the subpixels comprises:

obtaining a second preset curve and a third preset curve, where the second preset curve refers to a correspondence relationship between the position coordinates and first sub-compensation gains, and the third preset curve refers to a correspondence relationship between the position coordinates and second sub-compensation gains;

determining the first sub-compensation gains corresponding to the position coordinates on the second preset curve, and determining the second sub-compensation gains corresponding to the position coordinates on the third preset curve; and determining a product of each of the first sub-compensation gains and a corresponding one of the second sub-compensation gains as a corresponding one of the second compensation gains.

11. The brightness compensation method according to claim 10, further comprising:

selecting a plurality groups of position coordinates and first sub-compensation gains corresponding to the position coordinates to establish the second preset curve; and selecting a plurality groups of position coordinates and second sub-compensation gains corresponding to the position coordinates to establish the third preset curve.

12. The brightness compensation method according to claim 1, wherein the step of performing the brightness compensation on the frame of display image according to the second compensation gains corresponding to the subpixels and the first compensation gain comprises:

determining a product of the first compensation gain and each of the second compensation gains as a target compensation gain of a corresponding one of the subpixels; and performing a brightness compensation on each of the subpixels according to the target compensation gain correspondingly.

13. The brightness compensation method according to claim 12, wherein the step of performing the brightness compensation on each of the subpixels according to the target compensation gain correspondingly comprises:

obtaining original compensation data of the subpixels;

determining a product of the original compensation data and the target compensation gain as target compensation data of a corresponding one of the subpixels; and controlling each of the subpixel to emit light according to the target compensation data correspondingly.

14. The brightness compensation method according to claim 1, wherein the step of determining the first compensation gain according to the brightness values of the subpixels comprises:

obtaining a first average brightness value of red subpixels, a second average brightness value of green subpixels, a third average brightness value of blue subpixels according to the brightness values of the subpixels, and a fourth average brightness value of white subpixels according to the brightness values of the subpixels;

calculating an average picture level of the frame of display image according to a preset formula $APL\_sum=\alpha*APL\_r+\beta*APL\_g+\gamma*APL\_b+\delta*APL\_w$, where APL_sum refers to the average picture level, APL_r refers to the first average brightness value, APL_g refers to the second average brightness value, APL_b refers to the third average brightness value, APL_w refers to the fourth average brightness value, and $\alpha$, $\beta$, $\gamma$, and $\delta$ are corresponding preset coefficients; and determining the first compensation gain according to the average picture level.

15. The brightness compensation method according to claim 14, wherein $\alpha+\beta+\Gamma+\delta=1$.

16. A brightness compensation device, comprising:

a first field programmable gate array (FPGA) or application specific integrated circuit (ASIC), defined as a frame of display image brightness acquisition module, configured to obtain brightness values of subpixels in a frame of display image;

a second FPGA or ASIC, defined as a position coordinate acquisition module, configured to obtain position coordinates corresponding to the subpixels according to positions of the subpixels in a coordinate system;

a third FPGA or ASIC, defined as a compensation gain acquisition module, configured to acquire a first compensation gain based on the brightness values of the subpixels, and acquire second compensation gains according to the position coordinates of the subpixels respectively; and a fourth FPGA or ASIC, defined as a brightness compensation module, configured to compensate the frame of display image according to the first compensation gain and the second compensation gains, wherein a calculation formula of the brightness values of the subpixels is: $LUM\_pixel=(D\_pixel/Lmax)^{gma}$, where D_pixel refers to an input data of each of the subpixels, Lmax refers to a maximum grayscale value of a display panel comprising the subpixels, LUM_pixel refers to each of the brightness values of the subpixels, and gma refers to a gamma value of the display panel.

17. A brightness compensation method, comprising:

obtaining brightness values of subpixels in a frame of display image;

determining a first compensation gain according to the brightness values of the subpixels;

obtaining position coordinates corresponding to the subpixels according to positions of the subpixels in a coordinate system;

obtaining second compensation gains corresponding to the subpixels according to the position coordinates corresponding to the subpixels, which comprising:

obtaining a second preset curve and a third preset curve, where the second preset curve refers to a correspondence relationship between the position coordinates and first sub-compensation gains, and the third preset curve refers to a correspondence relationship between the position coordinates and second sub-compensation gains;

determining the first sub-compensation gains corresponding to the position coordinates on the second preset curve, and determining the second sub-compensation gains corresponding to the position coordinates on the third preset curve; and determining a product of each of the first sub-compensation gains and a corresponding one of the second sub-compensation gains as a corresponding one of the second compensation gains; and performing a brightness compensation on the frame of display image according to the second compensation gains corresponding to the subpixels and the first compensation gain.

18. The brightness compensation method according to claim 17, the step of obtaining the second compensation gains corresponding to the subpixels according to the position coordinates corresponding to the subpixels further comprising:

selecting a plurality groups of position coordinates and first sub-compensation gains corresponding to the position coordinates to establish the second preset curve; and selecting a plurality groups of position coordinates and second sub-compensation gains corresponding to the position coordinates to establish the third preset curve.

19. The brightness compensation method according to claim 17, wherein the step of determining the first compensation gain according to the brightness values of the subpixels comprises:

obtaining a first average brightness value of red subpixels, a second average brightness value of green subpixels, and a third average brightness value of blue subpixels according to the brightness values of the subpixels;

calculating an average picture level of the frame of display image according to a preset formula $APL\_sum=\alpha*APL\_r+\beta*APL\_g+\gamma*APL\_b$, where APL_sum refers to the average picture level, APL_r refers to the first average brightness value, APL_g refers to the second average brightness value, APL_b refers to the third average brightness value, and $\alpha$, $\beta$, and $\gamma$ are preset coefficients; and determining the first compensation gain according to the average picture level.

20. The brightness compensation method according to claim 17, wherein the step of determining the first compensation gain according to the brightness values of the subpixels comprises:

obtaining a first average brightness value of red subpixels, a second average brightness value of green subpixels, a third average brightness value of blue subpixels according to the brightness values of the subpixels, and a fourth average brightness value of white subpixels according to the brightness values of the subpixels;

calculating an average picture level of the frame of display image according to a preset formula $APL\_sum=\alpha*APL\_r+\beta*APL\_g+\gamma*APL\_b+\delta*APL\_w$, where APL_sum refers to the average picture level, APL_r refers to the first average brightness value, APL_g refers to the second average brightness value, APL_b refers to the third average brightness value, APL_w refers to the fourth average brightness value, and $\alpha$, $\beta$, $\gamma$, and $\delta$ are corresponding preset coefficients; and determining the first compensation gain according to the average picture level.

* * * * *